US010611117B2

(12) United States Patent
Postoaca et al.

(10) Patent No.: US 10,611,117 B2
(45) Date of Patent: Apr. 7, 2020

(54) PACKAGING LAMINATE (71) Applicant: TETRA LAVAL HOLDINGS & FINANCE S.A., Pully (CH)

(72) Inventors: Ion Postoaca, Bjärred (SE); Åke Persson, Furulund (SE); Sven Keiter, Lund (SE); Krister Uvnäs, Södra Sandby (SE); Andreas Hessmark, Lund (SE); Magnus Just, Glumslöv (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 8 days.

(21) Appl. No.: 15/441,602

(22) Filed: Feb. 24, 2017

(65) Prior Publication Data

US 2017/0157886 A1 Jun. 8, 2017

Related U.S. Application Data (62) Division of application No. 13/641,233, filed as application No. PCT/SE2011/050451 on Apr. 13, 2011, now Pat. No. 9,616,645.

(30) Foreign Application Priority Data

Apr. 15, 2010 (SE) ........................................ 1000382

(51) Int. Cl.
*B32B 3/26* (2006.01)
*B32B 15/20* (2006.01)
(Continued)

(52) U.S. Cl.
CPC ................ *B32B 3/266* (2013.01); *B32B 3/20* (2013.01); *B32B 15/08* (2013.01); *B32B 15/12* (2013.01);
(Continued)

(58) Field of Classification Search
CPC ... B32B 15/12; B32B 15/20; B32B 2038/042; B32B 2307/7244; B32B 2309/12;
(Continued)

(56) References Cited

U.S. PATENT DOCUMENTS 3,393,118 A * 7/1968 Ekstrom ................. B32B 27/00
156/252
4,877,196 A 10/1989 Heymanns
(Continued)

FOREIGN PATENT DOCUMENTS

CN 1481304 A 3/2004
EP 0 144 011 A2 6/1985
(Continued)

OTHER PUBLICATIONS

International Search Report (PCT/ISA/210) dated Jul. 18, 2011, by the Swedish Patent Office as the International Searching Authority for International Application No. PCT/SE2011/050451.
(Continued)

*Primary Examiner* — Yan Lan
(74) *Attorney, Agent, or Firm* — Buchanan Ingersoll & Rooney PC (57) ABSTRACT A packaging laminate includes a core layer having at least one through-hole which on one side is covered by a barrier film and an outer layer of a polymeric material, wherein said outer polymeric layer and said barrier film are laminated to each other in a manner such that said polymeric layer and said barrier film are separated from each other along parallel, visually detectable air-filled channels formed by these two layers within the area of said at least one through-hole.

7 Claims, 5 Drawing Sheets (51) Int. Cl.
  *B32B 15/12* (2006.01)
  *B32B 37/00* (2006.01)
  *B32B 38/04* (2006.01)
  *B32B 27/10* (2006.01)
  *B32B 15/08* (2006.01)
  *B32B 3/20* (2006.01)
  *B32B 29/00* (2006.01)
  *B32B 27/32* (2006.01)
  *B32B 37/10* (2006.01)
  *B65D 65/40* (2006.01)
  *B32B 37/15* (2006.01)
  *B32B 37/20* (2006.01)

(52) U.S. Cl.
  CPC .............. *B32B 15/20* (2013.01); *B32B 27/10* (2013.01); *B32B 27/32* (2013.01); *B32B 29/00* (2013.01); *B32B 37/10* (2013.01); *B65D 65/40* (2013.01); *B32B 37/0053* (2013.01); *B32B 37/153* (2013.01); *B32B 37/20* (2013.01); *B32B 38/04* (2013.01); *B32B 2038/042* (2013.01); *B32B 2307/7244* (2013.01); *B32B 2307/732* (2013.01); *B32B 2309/12* (2013.01); *B32B 2317/12* (2013.01); *B32B 2439/00* (2013.01); *B32B 2439/70* (2013.01); *B32B 2553/00* (2013.01); *B32B 2553/023* (2013.01); *B32B 2553/026* (2013.01); *Y10T 156/10* (2015.01); *Y10T 428/24331* (2015.01)

(58) Field of Classification Search
  CPC ............ B32B 2317/12; B32B 2439/70; B32B 2553/00; B32B 27/10; B32B 37/0053; B32B 37/10; B32B 37/153; B32B 3/20; B32B 3/266; E06B 9/44; Y10T 156/10; Y10T 428/243331
  USPC ................................ 428/138, 141, 167, 36.9
  See application file for complete search history.

(56) References Cited

U.S. PATENT DOCUMENTS

| | | | |
|---|---|---|---|
| 4,950,354 A | 8/1990 | Schirmer | |
| 5,516,386 A | 5/1996 | Savarese | |
| 5,665,456 A | 9/1997 | Kannankeril et al. | |
| 5,940,969 A | 8/1999 | Kuosmanen et al. | |
| 6,036,803 A | 3/2000 | Lasson et al. | |
| 2006/0024495 A1 | 2/2006 | Romling et al. | |
| 2007/0257402 A1* | 11/2007 | Rasmussen | ............ B29C 53/28 264/339 |

FOREIGN PATENT DOCUMENTS

| | | | |
|---|---|---|---|
| EP | 0 465 259 A1 | | 1/1992 |
| EP | 0 575 703 A1 | | 12/1993 |
| EP | 1 016 518 A1 | | 7/2000 |
| EP | 1 621 330 A1 | | 2/2006 |
| GB | 1 558 465 | | 1/1980 |
| JP | 6-297604 A | | 10/1994 |
| JP | 6-297605 | | 10/1994 |
| JP | 6-297605 A | | 10/1994 |
| JP | 2004136606 | | 5/2004 |
| JP | 2004516143 A | | 6/2004 |
| WO | WO 02/49832 | * | 6/2002 |
| WO | WO 02-49832 A1 | | 6/2002 |
| WO | WO 02/49833 A1 | | 6/2002 |
| WO | WO 2010/014871 A1 | | 2/2010 |

OTHER PUBLICATIONS

Communication Pursuant to Rule 164(1) EPC and Search Report dated Sep. 9, 2015 issued in the corresponding European Patent Application No. 11769175.8 (5 pages).

Communication and Search Report dated Jan. 8, 2016 issued in the corresponding European Patent Application No. 11769175.8 (5 pages).

The extended European Search Report dated Oct. 22, 2018, by the European Patent Office in corresponding European Patent Application No. 18179875.2-1014. (6 pages).

* cited by examiner

PACKAGING LAMINATE

CROSS REFERENCES TO RELATED APPLICATIONS

This application is a Divisional of U.S. patent application Ser. No. 13/641,233, filed Dec. 17, 2012, now allowed, which is a National Stage of PCT/SE2011/050451, filed Apr. 13, 2011, and claims priority under 35 U.S.C. § 119 to Swedish Patent Application No. 1000382-0, filed Apr. 15, 2010, the disclosures of all of which are incorporated herein by reference in their entirety.

TECHNICAL FIELD

The invention generally relates to the field of packaging materials. More particularly, the invention relates to a laminating roller for providing a packaging laminate.

BACKGROUND OF THE INVENTION

Packaging material for enclosing liquid or flowable food products is typically provided in the form of a continuous laminate web. The packaging material has a core layer made of paper or carton that is covered by a polymeric layer on a first, or outer, side. On the other side (i.e. the inner side facing the product to be enclosed) a multi-layer sheet is provided, typically comprising a layer of polymeric material, a barrier film, and an additional layer of polymeric material.

The barrier film comprises a layer which first and foremost constitutes a barrier to oxygen. A preferred such layer consists of a metal foil layer, preferably an aluminium foil layer. Disposable packaging containers, particularly those for storing liquids, are frequently produced from a laminated packaging material which consists of a carcass layer of paper, which layer is covered with thermoplastic materials and aluminium foil. The laminated packaging material is frequently supplied in the form of webs which are reeled on storage reels and which, after having been unrolled from their storage reel and cut into the desired width, are converted, by means of folding and sealing, into packaging containers in automatic packaging machines.

Such conversion may be done by unrolling the web from the storage reel and then forming a tube by the edges of the web being joined in an overlap seam, after which the tube which has been formed is filled with the intended filling product and subdivided into individual packaging containers by means of repeated transverse seals, which are arranged at a distance from each other at right angles to the tube. After the filling product which has been supplied has been enclosed in this way in sealed-off parts of the tube, these parts are separated from the tube by means of cuts made in the transverse sealing zones. The subdivided tube parts are then shaped, by means of folding along crease lines which are arranged in the packaging material, to form packaging containers of the desired shape, e.g. a parallelepipedic shape.

Packaging containers of this type are frequently provided with opening notches in the form of holes, openings or slits which are made in the packaging material and which are covered with strips which can be torn off and which are normally termed "pull-tabs". Alternatively the packaging device is provided with an external opening device, for example in the form of a plastic pouring spout having a screw top for resealing, which opening device is only allowed to penetrate the packaging laminate in connection with the packaging being opened and the product being used. In this connection, the packaging laminate is provided with an opening which consists of a punched-out hole in the core layer, leaving only the barrier film and the thermoplastic layers to cover the hole. Hence, the non-paper layers are extending throughout the laminated packaging material and thus cover the pre-punched holes in the core layer.

Thus, when the filling material consists of a sterile product, such as sterilized milk, or an acidic product, such as orange juice, the packaging container is frequently manufactured from a packaging laminate comprising an aluminium foil layer as the barrier film which makes the packaging impervious to the penetration of gases, such as oxygen, which can oxidize the contents and impair its quality. In order to achieve the desired imperviousness, it is important that the aluminium foil layer is not broken or damaged during the shaping of the packaging or when the packaging material is being manufactured and, for the function of the tear strip opening (the pull tab) or the penetrating opening device, it is of importance that the aluminium foil layer adheres well to the area around and within the opening holes since otherwise the opening operation can easily fail. Thus when a covering strip has been affixed over the intended opening, this strip can be torn off in connection with this operation, without, for all that, the inner lining of plastic and aluminium foil being torn open. When a penetrating opening device is used, this opening device can fail to make a clean cut in the aluminium foil and thermoplastic layer, resulting in frayed edges.

For this purpose, the packaging material is manufactured in a series of laminating steps. In a first step, the pre-punched core layer is provided with a layer of thermoplastic material and the barrier film is applied to the laminated side of the core layer and an outermost layer of thermoplastic material is laminated to the barrier layer. Preferably, the step of applying the layer of thermoplastic material to the core layer and the step of applying the barrier film may be done in a single step.

In this step, as well as in the final step, i.e. when the outermost layer of thermoplastic material is laminated to the barrier film, different problems may arise due to the provision of the punched-out holes. As the laminate of core material is supplied from a first line, and the barrier film and the outermost polymer layer are supplied from other lines, the core material, the barrier film and the outermost polymer layer will be laminated in a nip between an impression roller and a cooling roller rotating against each other. Typically, the impression roller has a core body made of a rigid material, and an outer surface being made of a less rigid material, i.e. the outer layer covering the core body is made of a more elastic material than the core body of the roller.

The pressing force of the nip between the impression roller and the cooling roller will force the outer surface of the impression roller to deform, such that the material of the outer surface of the impression roller is forced to move in the feeding direction, or machine direction, of the laminating station.

When the pre-punched hole of the core layer laminate enters the nip, the membrane covering the hole (i.e. the sandwich formed by a layer of thermoplastic material, the barrier film, and a further layer of thermoplastic material) will be more flexible and more able to stretch than the portions of the packaging material having the core layer of paper or carton. Hence, deformation of the outer surface of the impression roller may force the membrane covering the pre-punched hole to stretch and deform, leading to a tucking effect in the machine direction of the laminating station. During the last step of lamination, the barrier film and the thermoplastic layer will thus be rolled and tucked such that tensile stresses are assembled within the packaging material. This situation may cause the barrier film to break, wherein the barrier properties of the packaging material is lost or significantly reduced. This leads to an increase of waste material due to imperfect laminated holes.

SUMMARY

It is, therefore, an object of the present invention to overcome or alleviate the above-described problems.

A further object of the present invention is to increase the yield when manufacturing packaging material.

A yet further object is to provide a packaging laminate exhibiting a reduced floppiness within the area of a pre-punched hole of a core layer of the packaging laminate.

According to a first aspect of the present invention, a laminating roller for laminating a sheet of a packaging laminate is provided, said roller comprising at least one groove extending along the periphery of said roller and forming a border between two circumferential portions, wherein each of said two circumferential portions are extending continuously around the surface area of said roller. The roller is advantageous in that it reduces tucking of the elastic surface of the roller by allowing the elastic surface to displace laterally by means of the groove.

The at least one groove may extend perpendicular to the longitudinal axis of the roller, or the at least one groove may extend helically along the periphery of the roller. The at least one groove may further extend at a constant angle relative the longitudinal axis of said laminating roller. This is advantageous in that relatively simple manufacturing equipment may be used, still providing an efficient displacement of elastic material during lamination.

The outer surface of the laminating roller may be made of an elastic material having a hardness of 50 to 100 Shore A, which allows for readily available materials to be used.

The width of the at least one groove may be between 0.2 and 2.5 mm, and the depth of the at least one groove may be between 0.2 and 1.5 mm. This is advantageous in that a thin membrane, such as for example a laminated pre-punched hole, may set in the at least one groove such that the membrane covering the pre-punched hole is flexing into the at least one groove and may this allow entrapped air to travel in the space formed between the membrane and an adjacent laminated layer due to the displaced membrane. Hence, the quality of the laminated product is enhanced, and at the same time the laminated membrane is made more rigid due to the provision of air channels. The at least one groove may extend along the complete circumference of the roller. Hence, the angular position of the roller does not need to be synchronized with the exact position of the material to be laminated, in case a material having pre-punched holes is to be laminated.

The laminating roller may comprise a plurality of grooves, wherein the plurality of grooves is arranged at specific circumferential portions such that the distance between two adjacent grooves within a circumferential portion is substantially less than the distance between two adjacent circumferential portions. The laminating roller may also comprise a plurality of grooves, wherein the plurality of grooves is arranged at from a first end of the roller to a second end of the roller such that the distance between two adjacent grooves is constant. Hence, the roller may be constructed for a specific packaging material having grooves at positions corresponding to thin membranes of the packaging laminate, or as a general use roller for all kinds of packaging laminate.

According to a second aspect of the invention, a method for providing a packaging laminate is provided. The method comprises the step of feeding a web of a core layer being and at least one layer of thermoplastic material through a nip between a cooling roller and a laminating roller according to the first aspect of the invention.

The core layer may comprise at least one pre-punched hole, and the method may further comprise feeding a barrier film through said nip.

According to a third aspect of the invention, a packaging laminate comprising a core layer having at least one through-hole which on one side is covered by a barrier film and an outer layer of a polymeric material is provided. The outer polymeric layer and said barrier film are laminated to each other in a manner such that said polymeric layer and said barrier film are separated from each other along parallel, visually detectable air-filled channels formed by these two layers within the area of said at least one through-hole. This is advantageous in that the barrier film is intact also in the region of the through-hole, leading to a packaging laminate of high quality.

In a preferred embodiment of the method according to the third aspect of the invention said visually detectable air-filled channels extend in a direction parallel to opposite longitudinal edges of said core layer.

The core layer may be made of paper or carton, the barrier film may be made of Al, and a second side of said packaging laminate may be covered by a layer of polymeric material. Hence, the packaging laminate is readily available materials, still providing a high efficient barrier against oxygen.

According to a fourth aspect of the invention, a package for enclosing a food product is provided, wherein said package is made of a packaging laminate according to the third aspect of the invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein:

FIG. 3b is a detailed side view of a portion of the laminating roller of FIG. 3a;

DETAILED DESCRIPTION OF PREFERRED EMBODIMENTS

Figure 1:
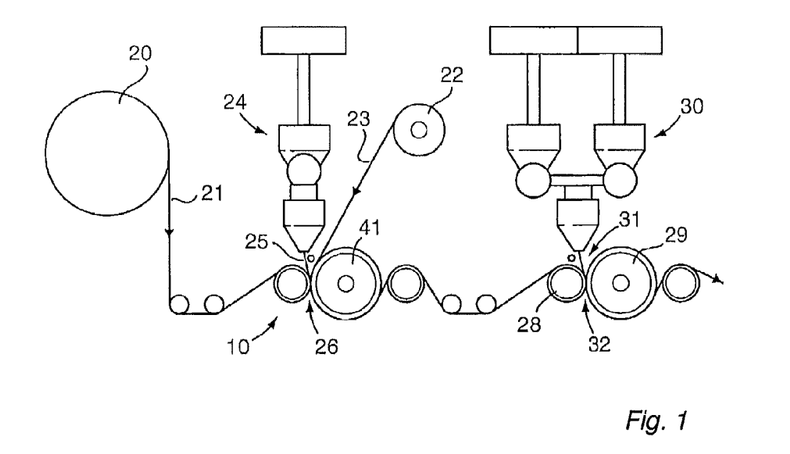
FIG. 1 shows a diagram of a line for laminating packaging material, which line comprises two press nips at least one of which uses a laminating roller in accordance with the invention.

A typical line for producing the inside part of a packaging laminate of the type which is referred to here, which line is shown diagrammatically in FIG. 1, comprises a storage reel 20 containing a web 21 of fibre material, i. e. paper or carton, which, on one of its sides, can exhibit a thin coating of a thermoplastic material, for example polyethylene. A storage reel containing a thin aluminium foil web 23 (5-20 µm) is designated 22 and an extruder for forming a film of molten laminant thermoplast 25 (preferably polyethylene) is designated 24. A laminating roller 10 interacts, in a press nip 26, with a cooling counter roller 41 having a steel surface in the laminating machine which is formed from these elements and also the extruder 24. From this first laminating machine 10, 41,24, the packaging laminate, which is now semifinished, proceeds onwards to a second laminating machine which comprises a press nip 32, having an laminating roller 28, in accordance with the invention, and a cooling counter roller 29, and an extruder 30, which can be arranged to coextrude a double-sided molten polymer film or layer 31 consisting of two different thermoplastic materials. In the second laminating machine 28,29,30, the semifinished packaging laminate which comes from the first laminating machine 10,41,24 is laminated together with this double-sided film 31 on that side of the laminate which exhibits the aluminium foil. The double-sided film can, for example, comprise an adhesive polymer such as for example ethylene acrylic acid ester, EAA, which is laminated closest to the aluminium foil, and a low density polyethylene polymer, such as for example LDPE, on the outside of this. During operation of the lamination line which is shown in FIG. 1, the laminating roller 10 typically has a peripheral speed of up to 800 m/min, preferably 300-700 m/min, and even more preferably 400-700 m/min. The line load in the press nip 26 is typically 20-60 N/mm, preferably 20-50 N/mm, and the press nip length is at least 20 mm, preferably 20-35 mm, and even more preferably 20-30 mm.

Although specific materials have been described, embodiments may include polymer barrier films, such as for example pre-manufactured blow moulded films, barrier films of metallized films or films coated by other means. Further, the layers of thermoplastic polymer may be provided as extrusion coated layers, i.e. solidified melt extrusion coated layers.

Figure 2:
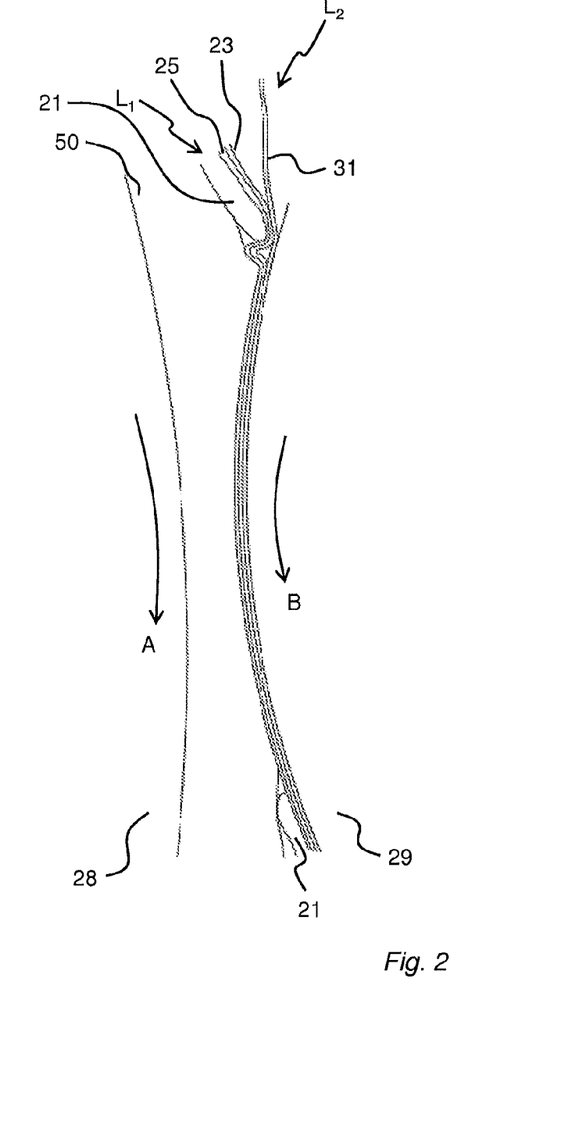
FIG. 2 is a cross-sectional view of a press nip using a laminating roller according to prior art.

With reference to FIG. 2, a press nip between a prior art laminating roller and a cooling roller is shown. The press nip is defined by the space between the elastic surface 50 of the laminating roller 28 and a cooling roller 29. The laminating roller 28 is rotating in the direction A, and the cooling roller 29 is rotating in the direction B. A first laminate is fed from a first line L1, comprising a core layer 21, and a thermoplastic layer 25. A barrier layer 23 is fed towards the press nip and the first laminate, and a second layer of extruded polymer material of thermoplastic material 31 is fed from a second line L2. The core layer 21 is pre-punched such that a hole is provided, which is shown as the interruption of the core layer 21.

The elastic material 50 of the laminating roller will be urged to roll up in the feeding direction A, thus stretching and tucking the membrane formed by the thermoplastic layer 25, the barrier film 23, and the layer of thermoplastic material 31. This is due to the fact that the membrane is more flexible than the part of the packaging laminate also carrying the core layer. Consequently, wrinkles may occur leading to an increase risk of ruptures in the membrane covering the pre-punched hole.

Figure 3A:
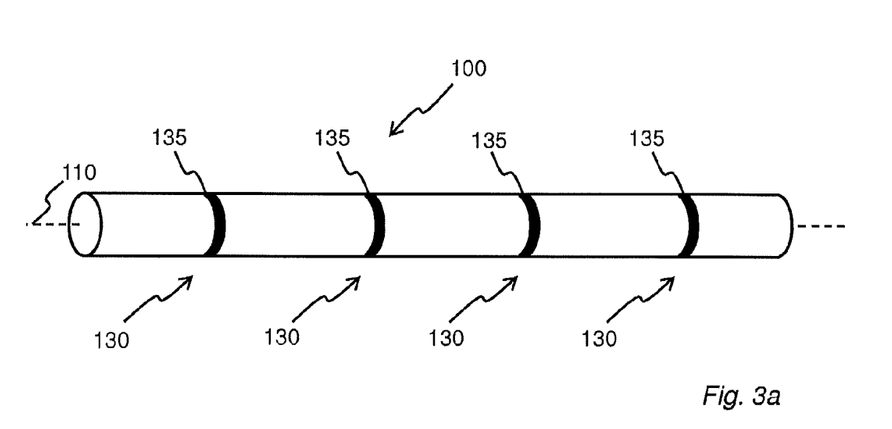
FIG. 3a is a perspective view of a laminating roller according to an embodiment.
Figure 3B:
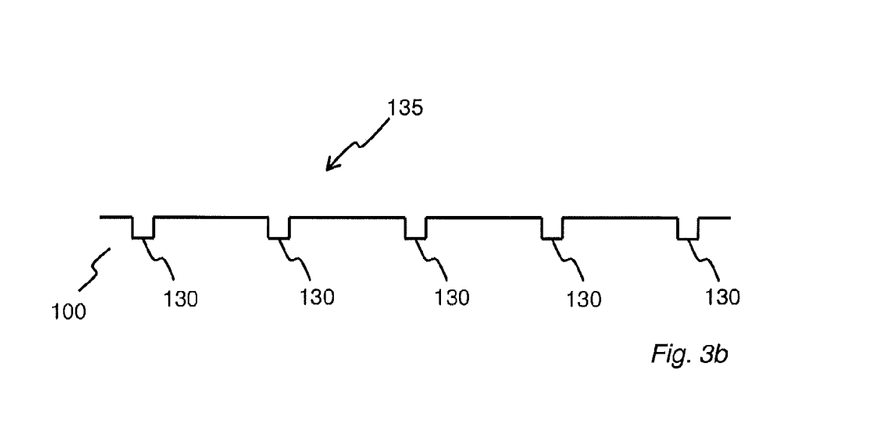

With reference to FIGS. 3a and 3b, a laminating roller 100 according to an embodiment is shown. The laminating roller 100 may be arranged as the laminating roller 10 of FIG. 1, the laminating roller 28 of FIG. 1, or both. The laminating roller has a longitudinal axis 110, and the roller 100 is driven by the cooling roller 29 which in turn is driven by a motor (not shown) for rotating the laminating roller 100 around the longitudinal axis 110. The outer surface 120 of the laminating roller 100 is made of an elastic material such that the laminating roller 100 may provide a homogenous pressure along the complete length of the laminating roller 100, thus compensating for any irregularities on the pressing surface of the roller 100. The elastic material of the outer surface of the laminating roller may for example have a hardness of 50 to 100 Shore A. The laminating roller 100 may have a diameter of 100 to 450 mm.

The laminating roller 100 further comprises a plurality of circumferential grooves 130 extending perpendicular to the longitudinal axis 110 of the roller 100.

Different configurations of the arrangement of the grooves 130 are available. For example, the roller may be provided with a plurality of circular grooves extending along the periphery of the roller, either perpendicular to the longitudinal axis of the roller or at a non-perpendicular angle. In another embodiment, the roller may be provided with a single groove extending in a helical direction from a first end of the roller to the second end of the roller. Preferably, such helical groove may extend at a constant angle relative the longitudinal axis of the roller. In a yet further embodiment, the roller may be provided with a plurality of wavy grooves extending along the periphery of the roller perpendicular to the longitudinal axis of the roller, or a single wavy groove extending in a helical direction from a first end of the roller to the second end of the roller.

In an embodiment, the grooves 130 are disposed at equal distance from each other along the complete length of the laminating roller 100. In another embodiment, the grooves 130 are provided in specific areas 135 along the length of the roller 100. This particular embodiment is shown in FIG. 3b.

The width of each groove is between 0.3 and 2.5 mm, preferably between 0.35 and 1.5 mm.

The depth of each groove may be 0.2 mm or more, preferably between 0.5 and 1.5 mm.

The distance between two adjacent grooves may be between 2 and 8 mm depending on hole size and core layer thickness. For example, a bigger hole and a thicker core layer may require a smaller distance between two adjacent grooves.

Again with reference to FIGS. 3a and 3b, the laminating roller has four grooved areas 135, arranged at equal distance. Each area 135 comprises five circumferential grooves 130, arranged at a distance of 6 mm from each other. Hence, the width of each area 135 is approximately 2.65 cm. It should be noted that FIGS. 3a and 3b are not to scale.

Each area 135 is arranged at a position corresponding to the lateral location of a pre-laminated hole of the packaging laminate when the packaging laminate is in contact and guided by means of the laminating roller 100. Consequently, the laminated roller of FIG. 3a is constructed to laminate a web having a width corresponding to four packages.

When a packaging laminate enters a press nip between a laminating roller 100 and a cooling roller, the grooves 130 will allow the elastic material of the roller 100 to displace laterally along the longitudinal direction of the roller 100, instead of rolling or tucking up in the feeding direction, i.e. the circumferential direction, which has been described previously with reference to FIG. 2.

Figure 4:
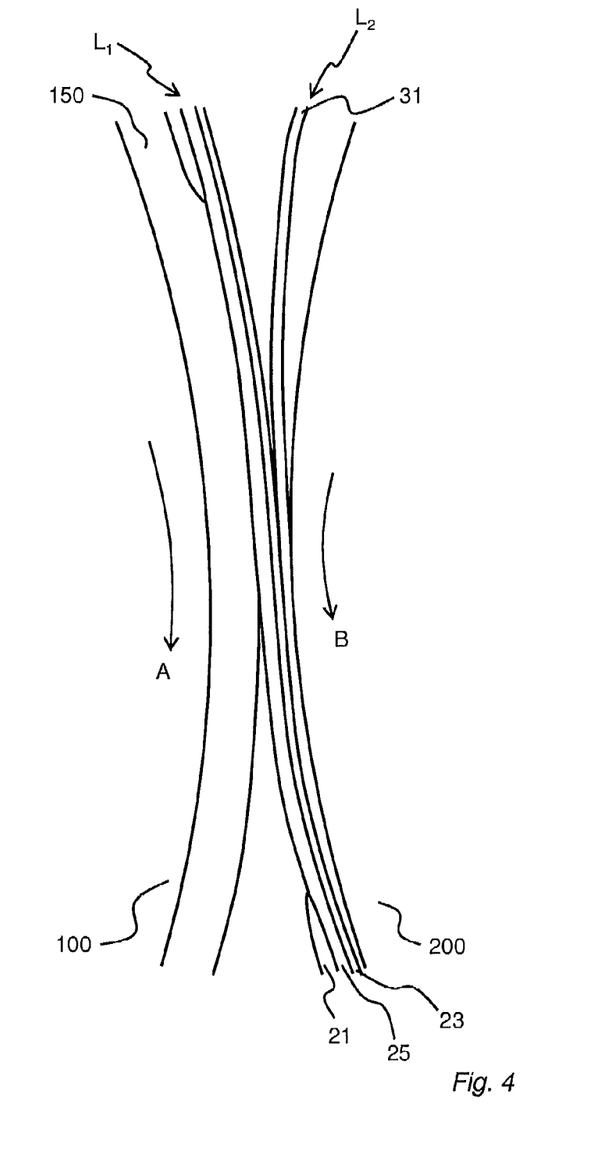
FIG. 4 is a cross-sectional view of a press nip using a laminating roller according to an embodiment.

The press nip is schematically shown in FIG. 4, where the laminating roller 100 is replacing the roller 28 of FIG. 1. The press nip is defined by the space between the elastic surface 150 of the laminating roller 100 and a cooling roller 200.

The laminating roller 100 is rotating in the direction A, and the cooling roller 200 is rotating in the direction B. A first laminate is fed from a first line L1, comprising a core layer 21, and a thermoplastic layer 25. A barrier layer 23 is fed towards the press nip and the first laminate, and a second layer of extruded polymer material of thermoplastic material 31 is fed from a second line L2. The core layer 21 is pre-punched such that a hole is provided, which is shown as the interruption of the core layer 21.

The elastic material 150 of the laminating roller will be urged to roll up in the feeding direction A. However, due to the provision of the grooves (not shown in FIG. 4), the elastic material will be allowed to flex and move not only in the feeding direction A, but also in the lateral direction. Hence, the resulting press nip is according to what is shown in FIG. 4, with no unintentional wrinkles or folds in the hole area.

Figure 5:
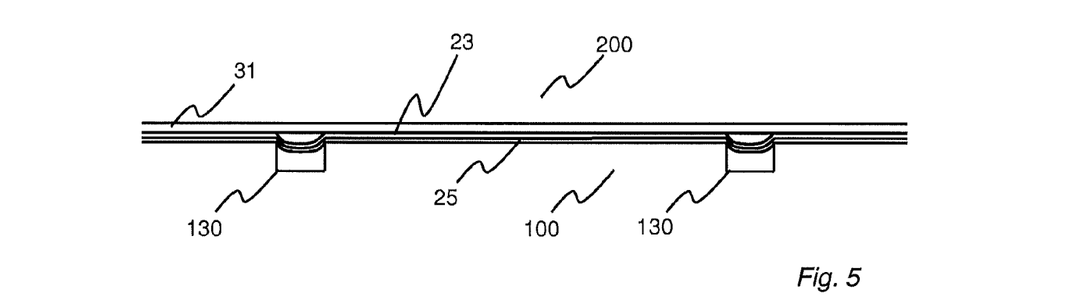
FIG. 5 shows an enlarged top view of the press nip shown in FIG. 4.

In FIG. 5, a portion of the press nip is shown from above. The portion, being an extract from a grooved area 135 receiving a pre-punched hole of the core layer, is formed by the impression of the laminating roller 100 on the cooling roller 200. The thermoplastic layer 25 and the barrier film 23 is fed from a first line, and the thermoplastic layer 31 is fed from a second line. These two layers are laminated in the press nip.

When the thermoplastic layer 25 and the barrier layer 23 is directed by means of the laminating roller 100, the laminated sheet will be able to set in the grooves 130, such that the laminated sheet is allowed to flex into the grooves. This is due to the fact that the width of each groove 130 is large enough, while at the same time the flexibility of the laminated sheet will urge the sheet towards the surface of the laminating roller 100. Hence, the surface of the laminated sheet will not be planar at the positions of a groove 130. The second layer of thermoplastic material 31 is on the other hand directed by means of the cooling roller 200. Since the surface of the cooling roller 200 is planar without the provision of grooves 130, the layer of thermoplastic material 31 will not come into contact with the barrier layer 23 at the positions of a groove 130. Consequently, air will be allowed to travel in the tunnel formed between the barrier layer 23 and the thermoplastic sheet 31. This is advantageous in that any air entrapped due to the edge of the hole will be allowed to escape through the tunnel. Hence, a built-up pressure is avoided and defects caused by air explosions within the packaging material are reduced. Further, the air channels will provide stability to the laminated membrane covering the pre-punched hole.

Figure 6:
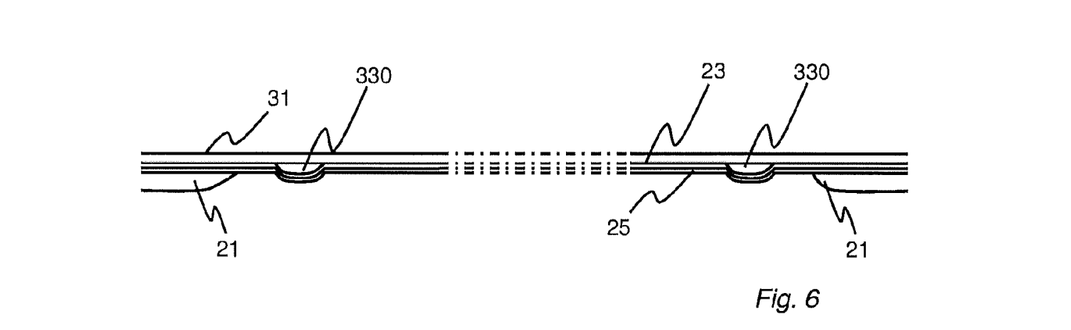
FIG. 6 is a cross-sectional view of a packaging material manufactured by using a laminating roller according to an embodiment of the present invention.

By using a laminating roller 100 according to the present invention, a packaging laminate may be provided that increases the manufacturing yield of packages having a pre-laminated hole. This is due to the fact that the provision of grooves in the laminating roller enables the elastic surface of the laminating roller to displace laterally and consequently the tucking of the membrane is reduced, Moreover, by designing the grooves according to specific dimensions, trapped air may be prevented from causing ruptures in the membrane due to explosions within the membrane. Moreover, the membrane formed at the pre-punched hole by means of the barrier layer 23 sandwiched between the thermoplastic layers 25, 31, will be made more rigid by the fact that air is enclosed within the packaging laminate, since the air channels will stabilize the membrane making it more resistant in the channel direction. This is shown in FIG. 6, which is a cross-sectional view of a packaging laminate 300 being formed by using a laminating roller 100 according to the present invention. The packaging laminate 300 comprises longitudinal portions 330 between the barrier layer 23 and the thermoplastic layer 31 enclosing air.

Due to the air inclusions within the membrane, the robustness of the packaging laminate as well as the package formed by the packaging laminate is increased according to what has previously been described. This enables the membrane covering the hole to be opened by a clean cut, since the stability of the membrane is increased. Consequently, the user experience of the opening is increased, as well as the overall quality of a package formed by the described packaging laminate.

The invention has mainly been described above with reference to a few embodiments. However, as is readily appreciated by a person skilled in the art, other embodiments than the ones disclosed above are equally possible within the scope of the invention, as defined by the appended patent claims. For example, the laminating roller may also be used in a prior or subsequent laminating station where a layer of thermoplastic polymer is applied also to the opposite side of the paperboard, i.e. the side towards the outside of a package, produced from the packaging laminate.

The invention claimed is:

1. A packaging laminate comprising a core layer having at least one through-hole which on one side is covered by a barrier film and an outer layer of a polymeric material, wherein said outer polymeric layer and said barrier film are laminated to each other in a manner such that said polymeric layer and said barrier film are separated from each other along parallel, visually detectable air-filled channels formed by these two layers within the area of said at least one through-hole and are in contact with each other in zones other than along the parallel, visually detectable air-filled channels within the area of said at least one through-hole.

2. The packaging laminate according to claim 1, wherein said visually detectable air-filled channels extend in a direction parallel to opposite longitudinal edges of said core layer.

3. The packaging laminate according to claim 1, wherein the core layer is made of paper or carton.

4. The packaging laminate according to claim 1, wherein the barrier film is made of Al.

5. The packaging laminate according to claim 1, wherein a second side of said packaging laminate is covered by a layer of polymeric material.

6. A package for enclosing a food product, wherein said package is made of a packaging laminate according to claim 1.

7. The packaging laminate according to claim 1, wherein said visually detectable air-filled channels are spaced apart at regular intervals.

* * * * *